United States Patent
Shikano et al.

(10) Patent No.: US 7,684,983 B2
(45) Date of Patent: Mar. 23, 2010

(54) SPEECH RECOGNITION APPARATUS AND VEHICLE INCORPORATING SPEECH RECOGNITION APPARATUS

(75) Inventors: Toshiya Shikano, Utsunomiya (JP); Tatsuya Kyomitsu, Oyama (JP)

(73) Assignee: Honda Motor Co., Ltd., Tokyo (JP)

( * ) Notice: Subject to any disclaimer, the term of this patent is extended or adjusted under 35 U.S.C. 154(b) by 703 days.

(21) Appl. No.: 11/249,073

(22) Filed: Oct. 11, 2005

(65) Prior Publication Data

US 2006/0100870 A1    May 11, 2006

(30) Foreign Application Priority Data

Oct. 25, 2004    (JP) .............................. 2004-309567

(51) Int. Cl.
*G10L 15/20*    (2006.01)
*G10L 17/00*    (2006.01)
*G10L 21/02*    (2006.01)

(52) U.S. Cl. ...................... 704/233; 704/231; 704/226; 704/251; 704/254

(58) Field of Classification Search ................ 704/254, 704/233, 231, 226, 251
See application file for complete search history.

(56) References Cited

U.S. PATENT DOCUMENTS

| 4,045,748 | A | * | 8/1977 | Filliman | 330/126 |
| 5,214,707 | A | * | 5/1993 | Fujimoto et al. | 704/275 |
| 5,862,240 | A | * | 1/1999 | Ohkubo et al. | 381/356 |
| 6,144,936 | A | * | 11/2000 | Jarvinen et al. | 704/226 |
| 7,099,821 | B2 | * | 8/2006 | Visser et al. | 704/226 |
| 7,243,065 | B2 | * | 7/2007 | Stephens et al. | 704/226 |
| 2004/0091123 | A1 | * | 5/2004 | Stark et al. | 381/86 |
| 2005/0071159 | A1 | * | 3/2005 | Boman et al. | 704/233 |

FOREIGN PATENT DOCUMENTS

JP    2000-132200    5/2000

* cited by examiner

*Primary Examiner*—David R Hudspeth
*Assistant Examiner*—Abdelali Serrou
(74) *Attorney, Agent, or Firm*—O'Melveny & Myers LLP

(57) ABSTRACT

When a voice input is detected as being applied to a directional microphone, sounds output from selected loudspeakers from among a plurality of loudspeakers, which otherwise would obstruct the speech recognition process, are attenuated, and sound signals supplied to the selected loudspeakers are combined with sound signals supplied to the other loudspeakers, and the combined sound signals are supplied to the other loudspeakers.

10 Claims, 14 Drawing Sheets

SPEECH RECOGNITION APPARATUS AND VEHICLE INCORPORATING SPEECH RECOGNITION APPARATUS

BACKGROUND OF THE INVENTION

1. Field of the Invention

The present invention relates to a speech recognition apparatus for recognizing the voice of a speaker entered through a voice input means, such as a microphone or the like, and more particularly to a speech recognition apparatus suitable for use in controlling a vehicle-mounted electronic unit based on speech recognition technology. In the speech recognition system, the speech recognition rate of speech, which exists together with background car audio sounds, is not lowered, by employing a microphone with high directivity. The present invention also concerns a vehicle incorporating such a speech recognition apparatus.

2. Description of the Related Art

Modern vehicles are equipped with many electronic units, which are constantly growing to provide higher functionality. Under such circumstances, speech recognition apparatuses have been proposed for generating remote control commands based on speech recognition, in order to easily control various electronic devices such as a navigation system, an audio system, or an air-conditioning system, which are incorporated in the vehicles.

As has been pointed out, when the voice of a speaker is input to a microphone of a speech recognition apparatus in a vehicle that is also equipped with an audio system, sounds from loudspeakers of the audio system are also input to the microphone, thereby lowering the speech recognition rate of the speech recognition apparatus (see, Japanese Laid-Open Patent Publication No. 2000-132200).

According to the audio/video system disclosed in Japanese Laid-Open Patent Publication No. 2000-132200, the above problem is solved by providing two loudspeakers mounted in a front region of the vehicle and two loudspeakers mounted in a rear region of the vehicle, and further wherein the speech recognition apparatus incorporated in the audio/video system includes a microphone embedded in the steering wheel of the vehicle. When the speech recognition apparatus operates to recognize the voice of the speaker, music sounds output from the two loudspeakers in the front region of the vehicle are attenuated within a speech frequency band, because they produce an adverse effect on the microphone in the steering wheel, and during speech recognition music sounds are radiated primarily from the two loudspeakers located in the rear region of the vehicle.

However, the disclosed speech recognition apparatus has the following disadvantage. When the audio/video system operates such that main vocal sounds are radiated only from the two loudspeakers, (e.g., left and right loudspeakers) in the front region of the vehicle, and main melody sounds are radiated only from the two loudspeakers in the rear region, the main vocal sounds become muted in the speech frequency band by the speech recognition apparatus, thereby developing an unnatural music sound environment in the passenger compartment of the vehicle. Conversely, when main melody sounds are radiated only from the two loudspeakers in the front region of the vehicle, and main vocal sounds are radiated only from the two loudspeakers in the rear region, the main melody sounds become muted in the speech frequency band by the speech recognition apparatus, thus also developing an unnatural music sound environment in the passenger compartment of the vehicle.

If only two loudspeakers, e.g., left and right, for stereophonic sound reproduction are installed in the passenger compartment of the vehicle, and the microphone embedded in the steering wheel has a directivity pattern covering the driver's seat, then only sounds radiated from the loudspeaker near the driver's seat may be muted by the speech recognition apparatus. However, this type of sound muting also develops an unnatural music sound environment in the passenger compartment.

Similar problems arise if the conventional speech recognition apparatus is combined with a 5.1-channel surround system. Specifically, the 5.1-channel surround system is capable of outputting independent sounds from respective loudspeakers for producing surround sound effects. If the sounds from certain loudspeakers of the 5.1-channel surround system are muted, then an unnatural and odd music sound environment is developed in the listening space. Therefore, when the conventional speech recognition apparatus is combined with a 5.1-channel surround system, the apparatus is required to attenuate the sounds in all channels by −20 dB, for example, when the voice of a speaker is input for speech recognition.

SUMMARY OF THE INVENTION

It is therefore an object of the present invention to provide a speech recognition apparatus, which is capable of highly accurate speech recognition in a natural and pleasant sound environment, even when the sounds output from at least one of a plurality of loudspeakers used in combination with the speech recognition apparatus are attenuated.

Another object of the present invention is to provide a speech recognition apparatus, which is capable of highly accurate speech recognition in a natural and pleasant sound environment, even if the sounds output from one of left and right loudspeakers are attenuated when the loudspeakers are radiating different types of sounds, e.g., one of the loudspeakers emits melody sounds and the other vocal sounds.

Still another object of the present invention is to provide a speech recognition apparatus, which is capable of highly accurate speech recognition in a natural and pleasant sound environment, even when the sounds are output from loudspeakers used in a 5.1-channel surround system.

Yet another object of the present invention is to provide a vehicle incorporating therein a speech recognition apparatus according to the present invention.

According to the present invention, there is provided a speech recognition apparatus comprising a directional voice input unit for inputting the voice from a speaker, a voice input state detector for detecting a voice input state in which the voice from the speaker is input to the directional voice input unit, a speech recognizer for recognizing the voice input from the directional voice input unit and outputting a command corresponding to the recognized voice, a sound output unit for outputting sound signals in a plurality of channels to corresponding loudspeakers, a sound output attenuator for attenuating sounds output from selected loudspeakers which would otherwise obstruct the speech recognition process performed by the speech recognizer when the voice input state detector detects the voice input state, and a combined sound generator for combining the sound signals output to the selected loudspeakers whose output sounds are attenuated, with the sound signals output to the other loudspeakers whose output sounds are not attenuated, thereby producing a combined sound signal to generate a combined sound.

With the above arrangement, when the voice input state detector detects the voice input state in which the voice from the speaker is input to the directional voice input unit, the sound output attenuator attenuates sounds output from selected loudspeakers which otherwise would obstruct the speech recognition process performed by the speech recognizer, and the combined sound generator combines the sound signals output to the selected loudspeakers whose output sounds are attenuated, with the sound signals output to the other loudspeakers whose output sounds are not attenuated, thereby producing a combined sound signal to generate a combined sound. Since the speech recognition rate of the speech recognition process is increased simply by suppressing the sounds output from a minimum number of speakers during the speech recognition process, and the sound signals output to the selected loudspeakers whose output sounds are attenuated are combined with the sound signals output to the other loudspeakers whose output sounds are not attenuated, producing a combined sound signal to generate a combined sound, the speech recognition process can be performed highly accurately in a natural and pleasant sound environment.

For example, one of two loudspeakers for stereophonic sound reproduction is used to output melody sounds and the other to output vocal sounds. Even if the sound (melody or vocal) output from one of the two loudspeakers is attenuated, the other loudspeaker outputs the combined sounds, i.e., the melody and vocal sounds, together. Consequently, the speech recognition process can be performed highly accurately in a natural and pleasant sound environment.

The directional voice input unit may be either a directional microphone or a microphone array that is capable of changing its directivity or providing directivity in a plurality of directions. The voice input state detector may be a speech switch, for allowing the speaker to input his or her voice to the voice input unit while the speech switch is operated, or during a certain period of time, e.g., several seconds, after the speech switch has been operated. The speech switch is located within a range that can be reached by the speaker. For example, the speech switch may be mounted on the steering wheel of a vehicle. The voice input state detector may be located near the driver's seat or near a passenger seat, such as a front passenger seat, in the passenger compartment of the vehicle.

If the voice input state detector comprises speech switches disposed near the driver's seat and the front passenger seat, respectively, then directional microphones may be disposed near both the driver's seat and the front passenger seat, respectively, or a microphone array may have its directivity oriented toward one of the speech switches which is operated, i.e., the speech switch near the driver's seat or near the front passenger seat. Sounds from loudspeakers that are not included in the directivity pattern may be attenuated, and the sound signals supplied to the loudspeakers whose output sounds are attenuated may be combined with the sound signals supplied to the loudspeakers whose output sounds are not attenuated.

According to the present invention, there is also provided a speech recognition apparatus comprising a microphone array for inputting the voice from a speaker and outputting a delay sum output signal from a speaker on the driver's seat in a vehicle and a delay sum output signal from a speaker on a passenger seat in the vehicle, a voice input state detector for detecting a voice input state in which the voice from the speaker on the driver's seat is input to the microphone array when the delay sum output signal from the speaker on the driver's seat reaches a predetermined level, and detecting a voice input state in which the voice from the speaker on the passenger seat is input to the microphone array when the delay sum output signal from the speaker on the passenger seat reaches a predetermined level, a speech recognizer for recognizing the voice input from the microphone array and outputting a command corresponding to the recognized voice, a sound output unit for outputting sound signals in a plurality of channels to corresponding loudspeakers, a sound output attenuator for attenuating sounds output from selected loudspeakers which otherwise would obstruct a speech recognition process performed by the speech recognizer when the voice input state detector detects the voice input state, and a combined sound generator for combining the sound signals output to the selected loudspeakers whose output sounds are attenuated, with the sound signals output to the other loudspeakers whose output sounds are not attenuated, thereby producing a combined sound signal to generate a combined sound.

With the above arrangement, when the voice input state detecting unit detects the voice input state in which the voice from the speaker on the driver's seat or the speaker on the passenger seat is input to the microphone array, the sound output attenuator attenuates sounds output from selected loudspeakers which otherwise would obstruct a speech recognition process performed by the speech recognizer, and the combined sound generator combines the sound signals output to the selected loudspeakers whose output sounds are attenuated, with the sound signals output to the other loudspeakers whose output sounds are not attenuated, thereby producing a combined sound signal to generate a combined sound. Since the speech recognition rate of the speech recognition process is increased simply by suppressing the sounds output from a minimum number of speakers during the speech recognition process, and the sound signals output to the selected loudspeakers whose output sounds are attenuated are combined with the sound signals output to the other loudspeakers whose output sounds are not attenuated, producing a combined sound signal to generate a combined sound, the speech recognition process can be performed highly accurately in a natural and pleasant sound environment.

The present invention is particularly suitable when applied to a surround system having at least front, rear, left, and right independent channels. For example, a 5.1-channel surround system has a single central loudspeaker, two main loudspeakers, two rear loudspeakers, and a single superwoofer making up the 0.1 channel, each outputting different sounds. If the sound output from one of these loudspeakers is attenuated, e.g., if the main melody sound is attenuated, then an unnatural music sound environment is developed. According to the present invention, even if the sound output from one of the loudspeakers is attenuated, the sound signal supplied to the loudspeaker whose output sound is attenuated is combined with a sound signal supplied to another loudspeaker. Consequently, the speech recognition process can be performed highly accurately in a natural and pleasant sound environment. The surround system having at least front, rear, left, and right independent channels may be a 5.1-channel surround system, a 6.1-channel surround system, or a 7.1-channel surround system.

The sound output attenuator may attenuate only sounds in a frequency range which is used during the speech recognition process performed by the speech recognizer. For example, only sound signals in a middle frequency range, which would tend to obstruct the speech recognition process, may be combined with the sound signal for another loudspeaker, and sounds in lower and higher frequency ranges, outside of the frequency range of the voice input unit, may be output unattenuated from the loudspeaker whose output sound in the middle frequency range is attenuated. Consequently, the speech recognition process can be performed highly accurately in a more natural and pleasant sound environment.

A vehicle according to the present invention incorporates therein either one of the above speech recognition apparatuses.

According to the present invention, when the speech recognition process is performed to recognize the voice of the speaker, while attenuating sounds output from certain ones of the plurality of loudspeakers, sound signals supplied to those loudspeakers are combined with sound signals supplied to other loudspeakers, and combined sound signals are supplied to the other loudspeakers. Therefore, the speech recognition process can be performed highly accurately in a natural and pleasant sound environment.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
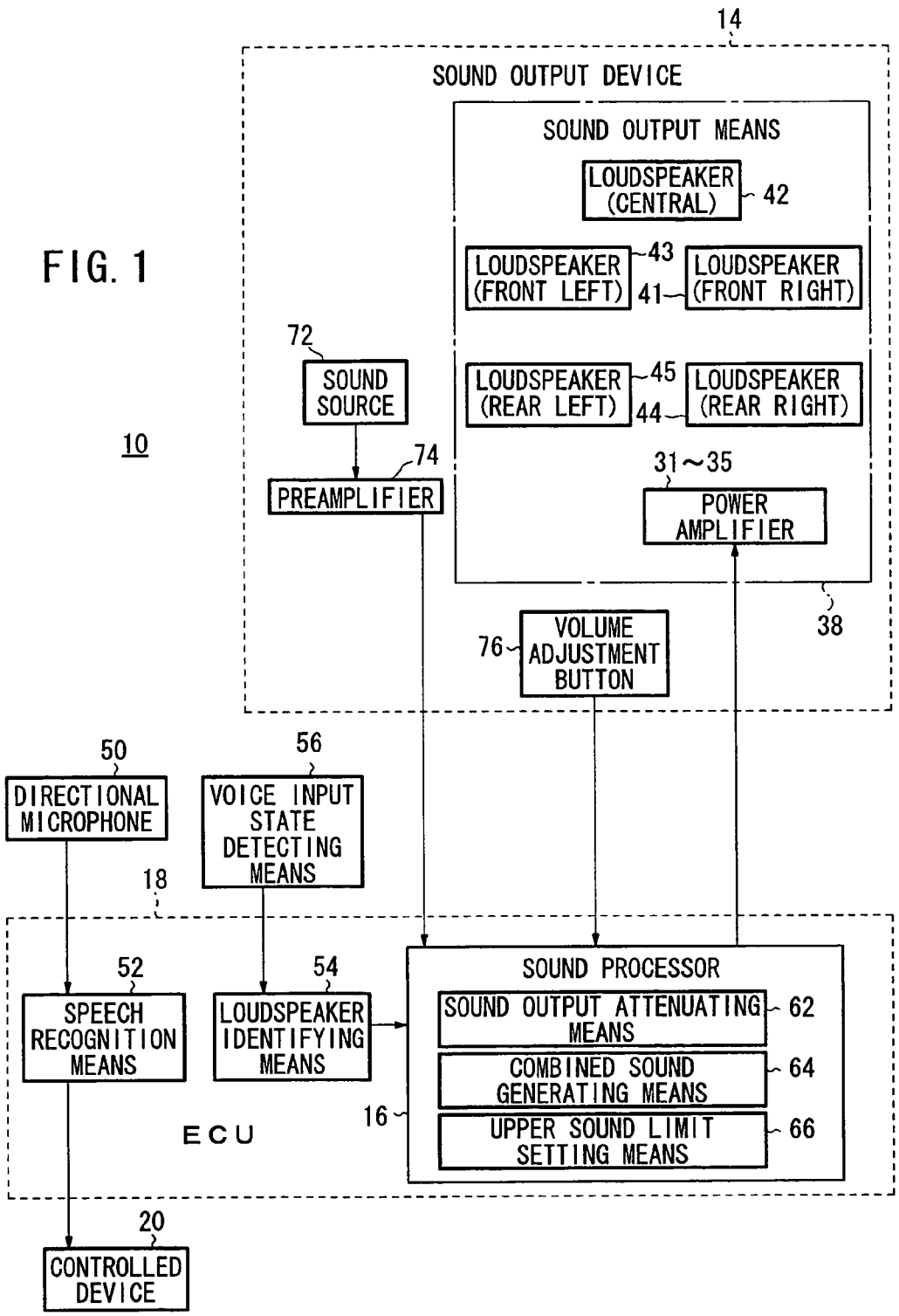
FIG. 1 is a block diagram of a speech recognition apparatus according to an embodiment of the present invention.

Like or corresponding parts are denoted by like or corresponding reference characters throughout the views.

Figure 2:
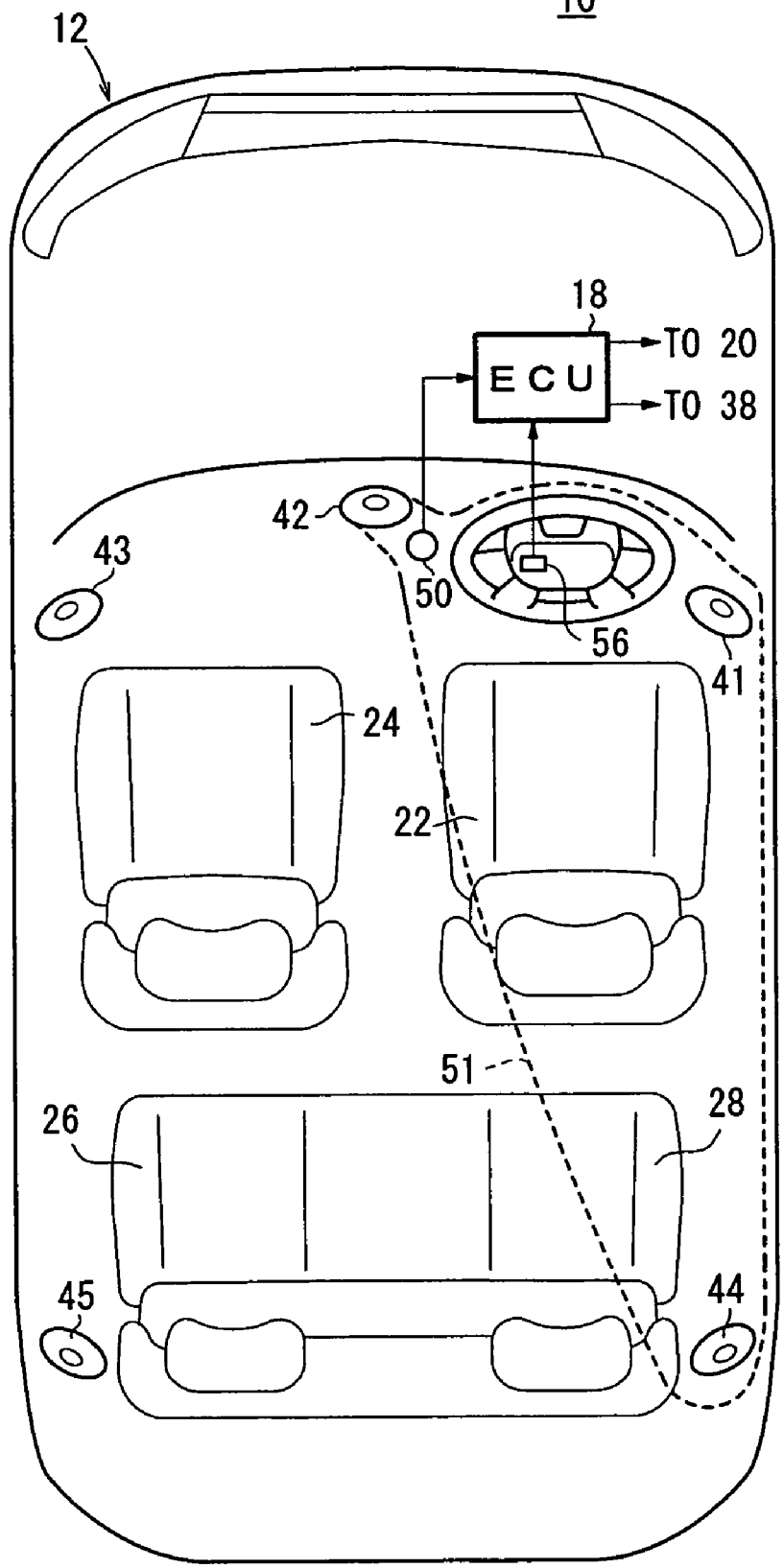
FIG. 2 is a schematic plan view of the passenger compartment of a vehicle that incorporates therein the speech recognition apparatus shown in FIG. 1.

FIG. 1 shows in block form a speech recognition apparatus 10 according to an embodiment of the present invention. FIG. 2 shows in schematic plan view the passenger compartment of a vehicle 12 that incorporates therein the speech recognition apparatus 10 shown in FIG. 1.

As shown in FIG. 2, the vehicle 12 includes a driver's seat 22, a front passenger seat 24, and rear passenger seats 26, 28, which are disposed in the passenger compartment. The vehicle 12 incorporates a 5.1-channel surround system having loudspeakers 41 through 45 disposed in respective positions, described below, in the passenger compartment. The front passenger seat 24 and the rear passenger seats 26, 28 serve as seats for vehicle passengers rather than the vehicle driver.

As shown in FIG. 1, the speech recognition apparatus 10 basically comprises a directional microphone 50, serving as a directional voice input means for inputting the voice from a speaker, a voice input state detecting means 56 for detecting a voice input state in which the voice from the speaker is input to the directional microphone 50, a sound output device 14 providing a 5.1-channel surround system, a controlled device 20, and an ECU (Electronic Control Unit) 18 for performing speech recognition and sound control. The ECU 18 includes a sound processor 16 for controlling the sound output device 14, and a speech recognition means 52 for controlling the controlled device 20 based on recognized speech.

The sound processor 16 has an upper sound limit setting means 66, a combined sound generating means 64, and a sound output attenuating means 62. The sound processor 16 controls processing operations of such means 66, 64, 62 based on information from a loudspeaker identifying means 54.

Figure 3:
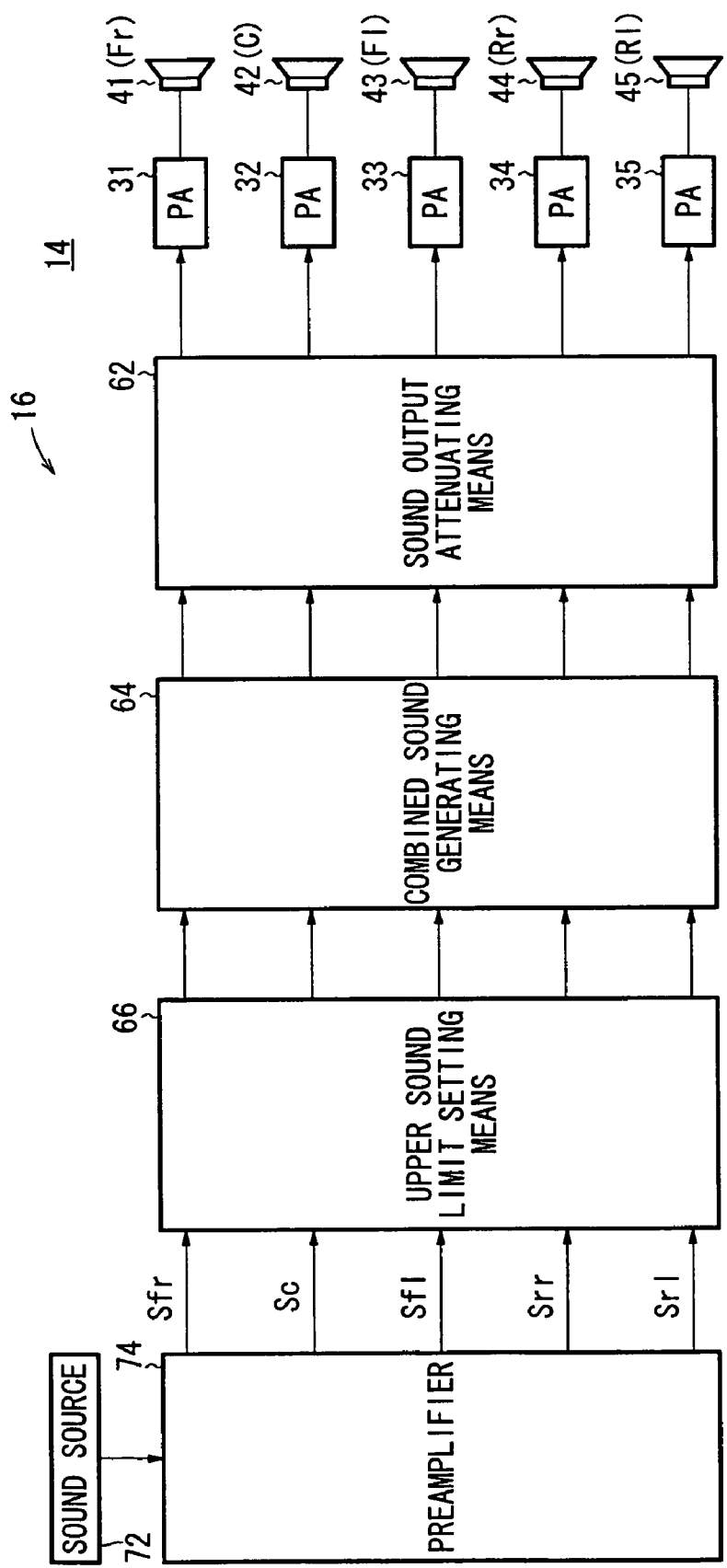
FIG. 3 is a block diagram of a sound output device together with a basic arrangement of a sound processor in the speech recognition apparatus.

FIG. 3 shows in block form the sound output device 14 together with a basic arrangement for the sound processor 16. The sound output device 14 basically includes a sound source 72 such as a tuner, a player, a hard disk, etc., a preamplifier 74 for preamplifying 5.1-channel sound signals output from the sound source 72, a volume adjustment button 76 (see FIG. 1), and a sound output means 38 comprising a plurality of power amplifiers 31 through 35, each of which amplifies a sound signal in one channel, and a plurality of loudspeakers 41 through 45 connected respectively to the power amplifiers 31 through 35.

As shown in FIG. 2, the loudspeaker 41 is a front right loudspeaker (Fr) disposed in a position rightward and forward of the front driver's seat 22, and outputs sounds depending on a front right sound signal Sfr (see FIG. 3) supplied from the sound source 72 through the preamplifier 74. The loudspeaker 42 is a central loudspeaker (C) disposed in the vicinity of the center of the instrument panel, and outputs sounds depending on a central sound signal Sc supplied from the sound source 72 through the preamplifier 74. The loudspeaker 43 is a front left loudspeaker (Fl) disposed in a position leftward and forward of the front passenger seat 24, and outputs sounds depending on a front left sound signal Sfl supplied from the sound source 72 through the preamplifier 74. The loudspeaker 44 is a rear right loudspeaker (Rr) disposed in a position rightward and rearward of the right rear passenger seat 28, and outputs sounds depending on a rear right sound signal Srr supplied from the sound source 72 through the preamplifier 74. The loudspeaker 45 is a rear left loudspeaker (Rl) disposed in a position leftward and rearward of the left rear passenger seat 26, and outputs sounds depending on a rear left sound signal Srl supplied from the sound source 72 through the preamplifier 74. The sounds are radiated from the loudspeakers 41 through 45 into the passenger compartment.

The 5.1-channel surround system also includes a superwoofer, which is a loudspeaker for radiating bass sounds at very low frequencies, in addition to the loudspeakers 41 through 45. The superwoofer is located adjacent to the central loudspeaker 42. The superwoofer covers a low frequency range up to 120 Hz, which is outside of the frequency band (voice frequency band from 150 to 6000 Hz) of the directional microphone 50. Since the frequency range covered by the superwoofer falls outside of the frequency range of the speech recognition apparatus 10, the superwoofer is not controlled for sound attenuation, and hence is not plotted in the drawings. In operation, the preamplifier 74 outputs a superwoofer sound signal to a power amplifier, which supplies an amplified sound signal to the superwoofer in order to radiate bass sounds.

The sound processor 16 controls processing operations of the upper sound limit setting means 66, the combined sound generating means 64, and the sound output attenuating means 62, based on information from the loudspeaker identifying means 54 and information from the volume adjustment button 76, in order to set upper limits for, combine, and attenuate the sound signals Sfr, Sc, Sfl, Srr, Srl output from the preamplifier 74.

As shown in FIG. 2, the directional microphone 50 is mounted on the instrument panel and has a directivity range surrounded by a pattern (referred to as "directivity pattern 51"). In the present embodiment, the speaker whose speech is to be recognized by the speech recognition apparatus 10 is the driver seated on the driver's seat 22. The directivity pattern 51 of the directional microphone 50 includes therein the central loudspeaker 42, the front right loudspeaker 41, and the rear right loudspeaker 44, which output sounds that may possibly tend to lower the speech recognition ratio of the speech recognition apparatus 10. Stated otherwise, the directional microphone 50 for use in recognizing the voice uttered by the speaker is positioned such that it also picks up sounds radiated by the central loudspeaker 42, the front right loudspeaker 41, and the rear right loudspeaker 44.

The ECU 18 includes an input interface, a CPU, a memory, and an output interface, as are well known in the art. The ECU 18 executes a program stored in the memory, in order to perform various processes including a speech recognition process, a sound control process, etc., for controlling the controlled device 20. The controlled device 20 may be a navigation system, an air-conditioning system, or an audio system. The ECU 18 is disposed in the vicinity of the instrument panel.

According to the present embodiment, the ECU 18 functions as the speech recognition means 52 for recognizing speech entered from the directional microphone 50, and for outputting commands corresponding to the recognized speech to the controlled device 20, the loudspeaker identifying means 54, and the sound processor 16.

As well known in the art, the speech recognition means 52 encodes voice signals entered from the directional microphone 50, analyzes the frequencies of the voice signals in order to recognize a speech pattern, compares the speech pattern with a speech dictionary in order to specify the contents of the voice signal, and outputs a command corresponding to the specified contents to the controlled device 20.

As illustrated in FIG. 2, when a voice input state detecting means 56, such as a pushbutton speech switch or the like, is mounted on the steering wheel only, then the speaker is limited to the driver on the driver's seat 22. Therefore, while the voice input state detecting means 56 is operated, e.g., while the pushbutton is pressed, or during a certain period of time after the voice input state detecting means 56 has been operated, the loudspeaker identifying means 54 identifies the central loudspeaker 42, the front right loudspeaker 41, and the rear right loudspeaker 44, which are included in the directivity pattern 51 of the directional microphone 50, as loudspeakers which would obstruct the speech recognition process and whose sounds are to be attenuated from among the loudspeakers 41 through 45. The loudspeaker identifying means 54 then supplies loudspeaker identifying information, which represents the identified loudspeakers, to the sound processor 16.

Loudspeakers whose sounds are to be attenuated may be identified in various ways depending on the number of voice input state detecting means 56 used, and/or the number and specifications of directional microphones 50 used.

Figure 4:
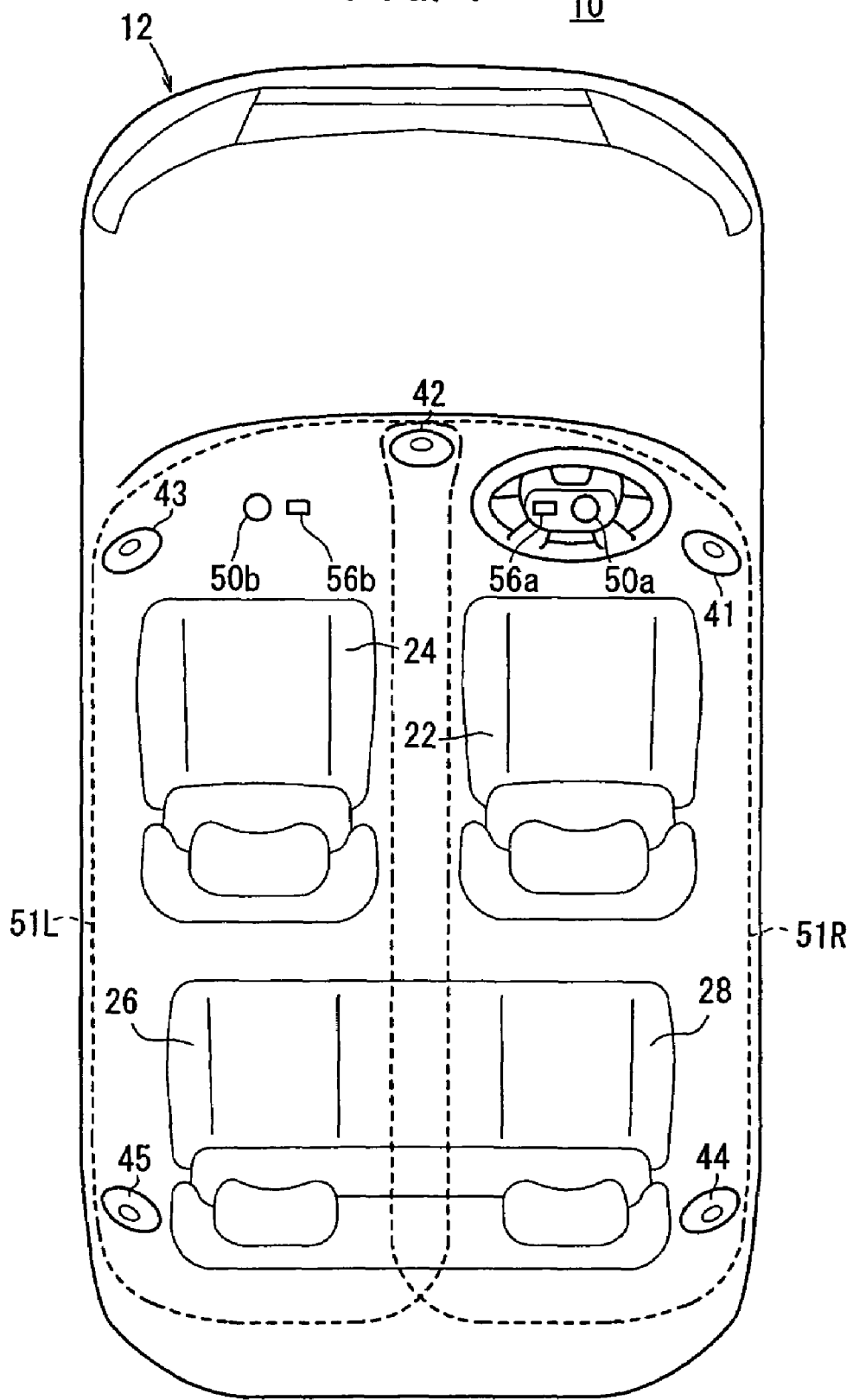
FIG. 4 is a schematic plan view of the passenger compartment of a vehicle in which a directional microphone and a voice input state detecting means are disposed in front of each of a driver's seat and a front passenger seat in the passenger compartment.

For example, FIG. 4 schematically shows the passenger compartment of a vehicle in which a directional microphone 50a and a voice input state detecting means 56a are disposed in front of the driver's seat 22, and another directional microphone 50b and a voice input state detecting means 56b are disposed in front of the front passenger seat 24. According to the layout shown in FIG. 4, when the voice input state detecting means 56a in front of the driver's seat 22 is operated, the loudspeakers 41, 42, 44 included in the directivity pattern 51R of the directional microphone 50a are identified as loudspeakers whose sounds are to be attenuated. At this time, the directional microphone 50b is turned off, and only a voice signal entered from the directional microphone 50a is supplied to the speech recognition means 52.

Conversely, when the voice input state detecting means 56b in front of the front passenger seat 24 is operated, the loudspeakers 42, 43, 45 included in the directivity pattern 51L of the directional microphone 50b are identified as loudspeakers whose sounds are to be attenuated. At this time, the directional microphone 50a is turned off, and only a voice signal entered from the directional microphone 50b is supplied to the speech recognition means 52.

Figure 5:
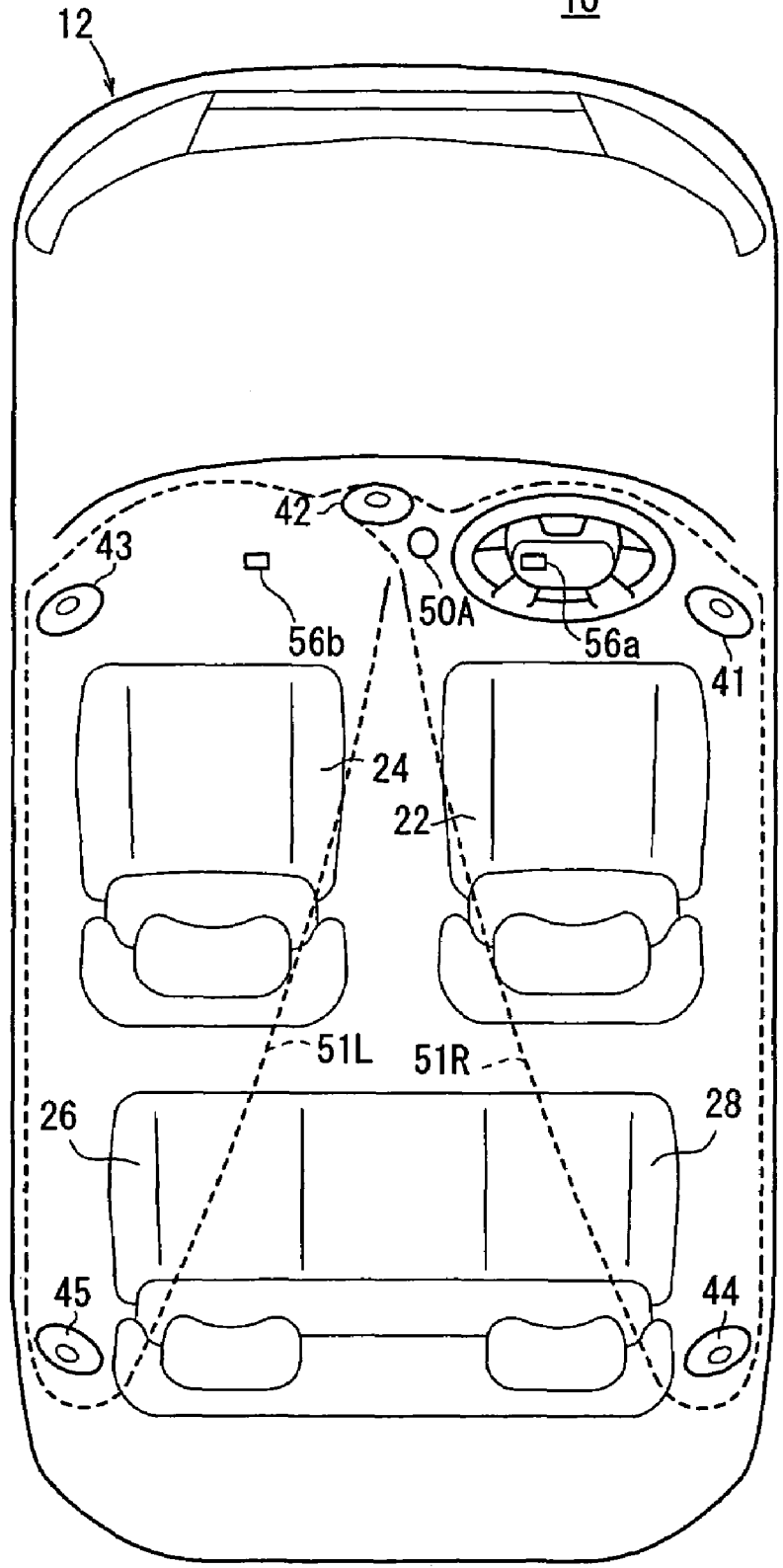
FIG. 5 is a schematic plan view of the passenger compartment of a vehicle, showing the directivity pattern of a directional microphone comprising a directional microphone array.
Figure 6A:
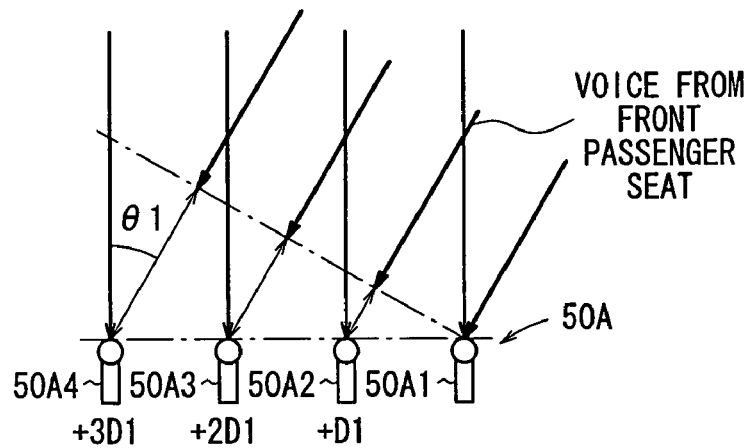
FIG. 6A is a diagram showing the relationship between a voice from the front passenger seat and its delay.
Figure 6B:
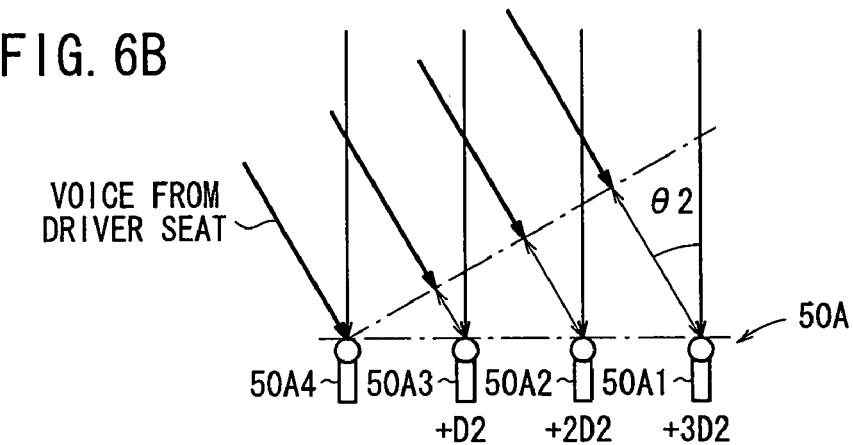
FIG. 6B is a diagram showing the relationship between a voice from the driver's seat and its delay.

In FIG. 5, the directional microphone 50 that is mounted on the instrument panel comprises a directional microphone array 50A, and the voice input state detecting means 56a, 56b are disposed respectively in front of the driver's seat 22 and the front passenger seat 24. As shown in FIG. 6A, the directional microphone array 50A comprises an array of four microphones 50A1 through 50A4. The front passenger seat 24 faces the microphones 50A1 through 50A4 obliquely at an angle θ1 to their direct forward directions, as shown in FIG. 6A. Therefore, the voice of the passenger seated on the front passenger seat 24 arrives at the microphones 50A2 through 50A4 with respective delay times D1, +2D1, +3D1 with respect to the voice arriving at the microphone 50A1. The driver's seat 22 faces the microphones 50A1 through 50A4 obliquely at an angle θ2 to their direct forward directions, opposite to the angle θ1, as shown in FIG. 6B. Therefore, the voice of the driver seated on the driver's seat 22 arrives at the microphones 50A3 through 50A1 with respective delay times D2, +2D2, +3D2 with respect to the voice arriving at the microphone 50A4.

Figure 6C:
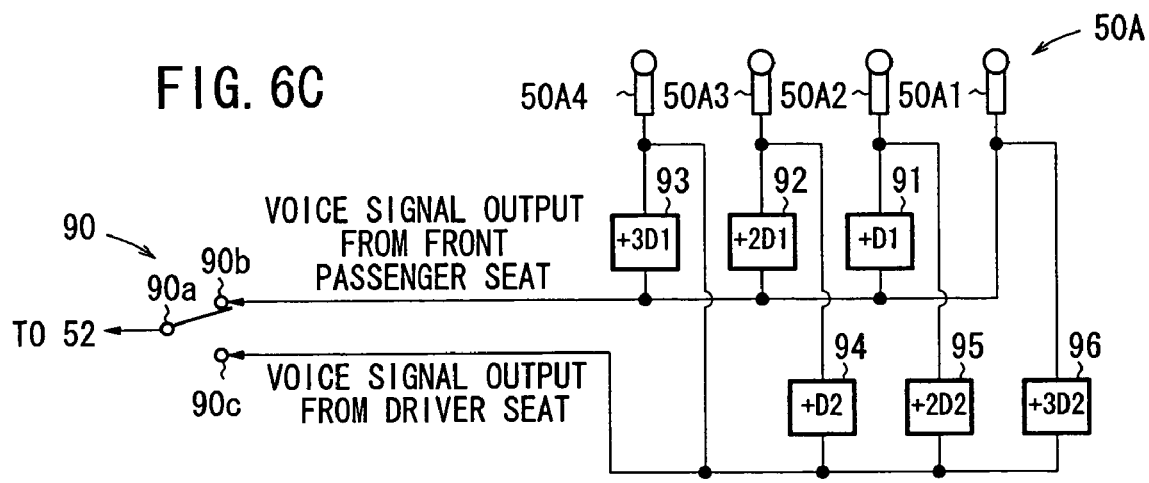
FIG. 6C is a diagram showing how to switch between an output signal representative of the voice from the front passenger seat (a delay sum output signal from a speaker on the front passenger seat) and an output signal representative of the voice from the driver's seat (a delay sum output signal from a speaker on the driver's seat)

As shown in FIG. 6C, delay units 91, 92, 93 having respective delay times D1, +2D1, +3D1 are connected respectively to the microphones 50A2 through 50A4, and delay units 94, 95, 96 having respective delay times D2, +2D2, +3D2 are connected respectively to the microphones 50A3 through 50A1. The microphone 50A1 and the delay units 91, 92, 93 have respective output terminals connected to a fixed contact 90b of a switch 90, and the microphone 50A4 and the delay units 94, 95, 96 have respective output terminals connected to a fixed contact 90c of the switch 90. A single directional microphone array 50A can thus supply an output signal representative of a voice from the front passenger seat 24 (a delay sum output signal from the speaker on the front passenger seat 24) to the contact 90b, and can also supply an output signal representative of a voice from the driver's seat 22 (a delay sum output signal from the speaker on the driver's seat 22) to the contact 90c.

In the arrangement shown in FIGS. 5 and 6, when the voice input state detecting means 56a in front of the driver's seat 22 is operated, the common terminal 90a of the switch 90 is connected to the fixed contact 90c, in order to supply the output signal representative of the voice from the driver's seat 22 to the speech recognition means 52. At this time, the loudspeakers 41, 42, 44 included in the directivity pattern 51R of the directional microphone array 50A are identified by the speaker identifying means 54 as loudspeakers whose sounds are to be attenuated.

When the voice input state detecting means 56b in front of the front passenger seat 24 is operated, the common terminal 90a of the switch 90 is connected to the fixed contact 90b, in order to supply the output signal representative of the voice from the front passenger seat 24 to the speech recognition means 52. At this time, the loudspeakers 42, 43, 44 included in the directivity pattern 51L of the directional microphone array 50A are identified by the speaker identifying means 54 as loudspeakers whose sounds are to be attenuated.

Figure 7:
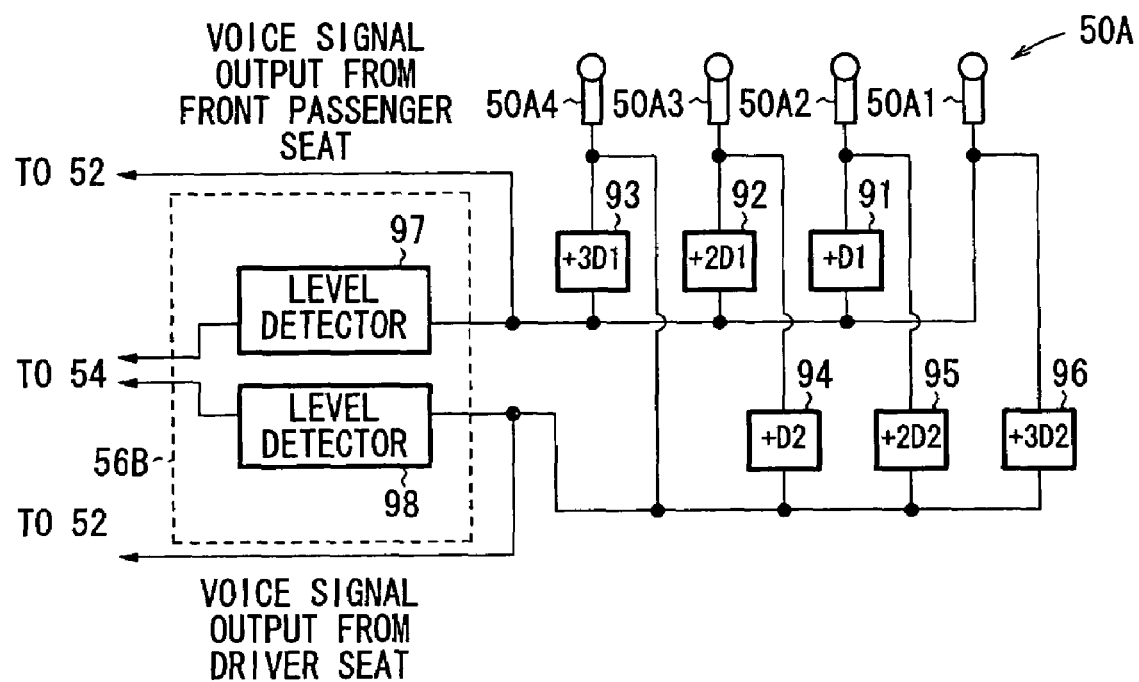
FIG. 7 is a diagram showing a wiring arrangement for automatically supplying an output signal representative of the voice from the front passenger seat (a delay sum output signal from a speaker on the front passenger seat) and an output signal representative of the voice from the driver's seat (a delay sum output signal from a speaker on the driver's seat)

The voice input state detecting means 56a, 56b, such as pushbutton speech switches or the like, may be omitted from the arrangement shown in FIG. 5. When the voice input state detecting means 56a, 56b are omitted, then, as shown in FIG. 7, a level detector 97 for detecting the level of an output signal representative of a voice from the front passenger seat 24 (a delay sum output signal from the speaker on the front passenger seat 24) is connected to the microphone 50A1 and the delay units 91, 92, 93, and a level detector 98 for detecting the level of an output signal representative of a voice from the driver's seat 22 (a delay sum output signal from the speaker on the driver's seat 22) is connected to the microphone 50A4 and the delay units 94, 95, 96. The level detectors 97, 98 function as a voice input state detecting means 56B. When the level of an output signal representative of a voice from the driver's seat 22, as detected by the level detector 98, reaches a predetermined level, the voice input state detecting means 56B detects the voice input from the driver's seat 22, and outputs detected information to the loudspeaker identifying means 54. When the level of an output signal representative of a voice from the front passenger seat 24, as detected by the level detector 97, reaches a predetermined level, the voice input state detecting means 56B detects the voice input from the front passenger seat 24, and outputs detected information to the loudspeaker identifying means 54.

As described above, the voice input state detecting means 56 and the directional microphone 50 may be of any of various arrangements.

For an easier understanding of the present invention, in the following description, it shall be assumed that the directivity pattern 51 of the directional microphone 50 is fixed in the vicinity of the driver's seat 22, as shown in FIG. 2.

The above-mentioned sound processor 16 may comprise the sound output attenuating means 62, the combined sound generating means 64 and the upper sound limit setting means 66. The sound output attenuating means 62 operates to attenuate sounds output from the loudspeakers 41, 42, 44 which otherwise would obstruct the speech recognition process carried out by the speech recognition means 52. The combined sound generating means 64 operates to combine the sounds output from the loudspeakers 41, 42, 44 and which are attenuated by the sound output attenuating means 62 with sounds output from the loudspeakers 43, 45, thereby generating a combined sound. The upper sound limit setting means 66 operates to set an upper volume limit of 70 dB, if the volume setting made through the volume adjustment button 76 is a sound pressure of 70 dB or higher.

The speech recognition apparatus 10 according to the present embodiment, and the vehicle 12 incorporating therein the speech recognition apparatus 10, are basically constructed and operate as described above. Details of an operation sequence of the speech recognition apparatus 10 shall be described below with reference to the flowcharts shown in FIGS. 8 and 9. Unless otherwise noted, the ECU 18 operates as a main control entity for executing the operation sequence. However, the ECU 18 may or may not be specifically referred to in the description of the operation sequence given below.

Figure 8:
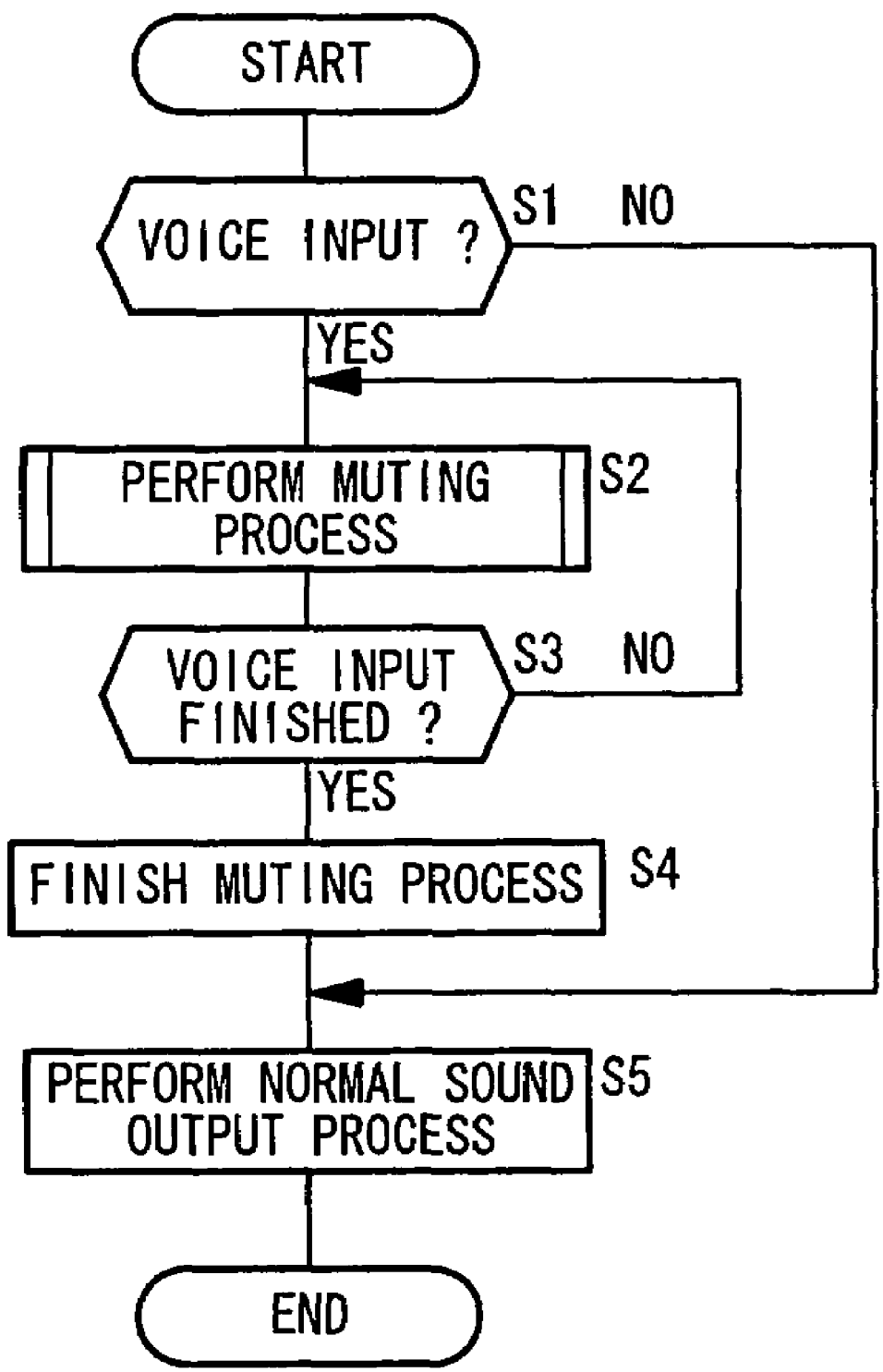
FIG. 8 is a main flowchart of an operation sequence of the speech recognition apparatus.

In step S1 shown in FIG. 8, the ECU 18 determines whether there is a voice input to the directional microphone 50 for speech recognition or not. Specifically, a voice input state for applying a voice input to the directional microphone 50 is detected while the voice input state detecting means 56 is operated, or during a certain period of time, e.g., several seconds, after the voice input state detecting means 56 has been operated. The sound processor 16 determines whether there is actually a voice input based on the loudspeaker identifying information from the loudspeaker identifying means 54.

If a voice input state is not determined, then the sound processor 16 performs a normal sound output process in step S5.

Figure 10:
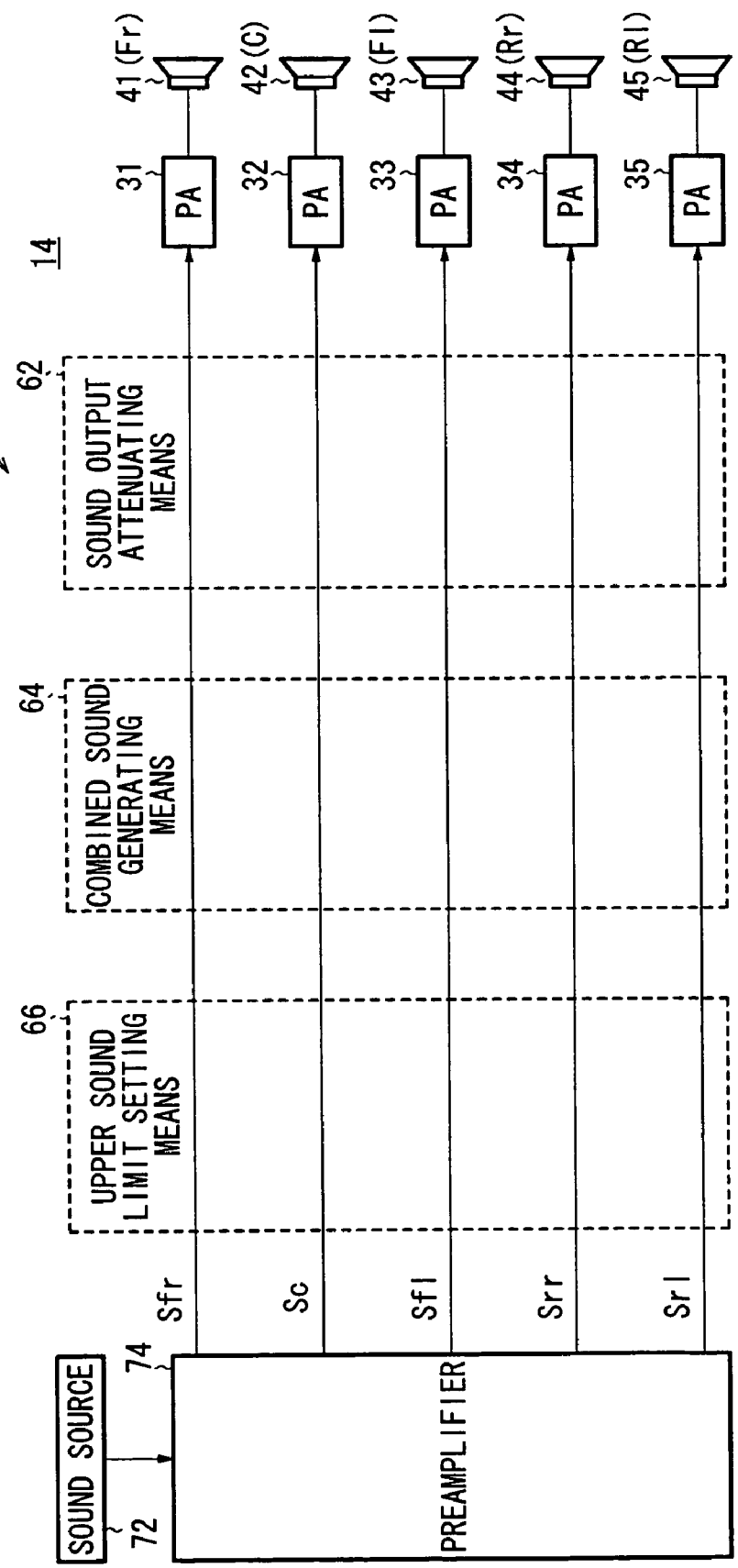
FIG. 10 is a block diagram showing connections for the sound output device in a normal sound output process.

FIG. 10 shows connections of the sound output device 14 during the normal sound output process. Since there is no voice input for speech recognition during the normal sound output process, the sound signals Sfr, Sc, Sfl, Srr, Srl output from the preamplifier 74 are supplied directly to the respective power amplifiers 31 through 35, which energize the respective loudspeakers 41 through 45 in order to output 5.1-channel surround sounds. Specifically, the sound signals Sfr, Sc, Sfl, Srr, Srl pass, unprocessed, through the upper sound limit setting means 66, the combined sound generating means 64, and the sound output attenuating means 62, to the respective power amplifiers 31 through 35.

Figure 9:
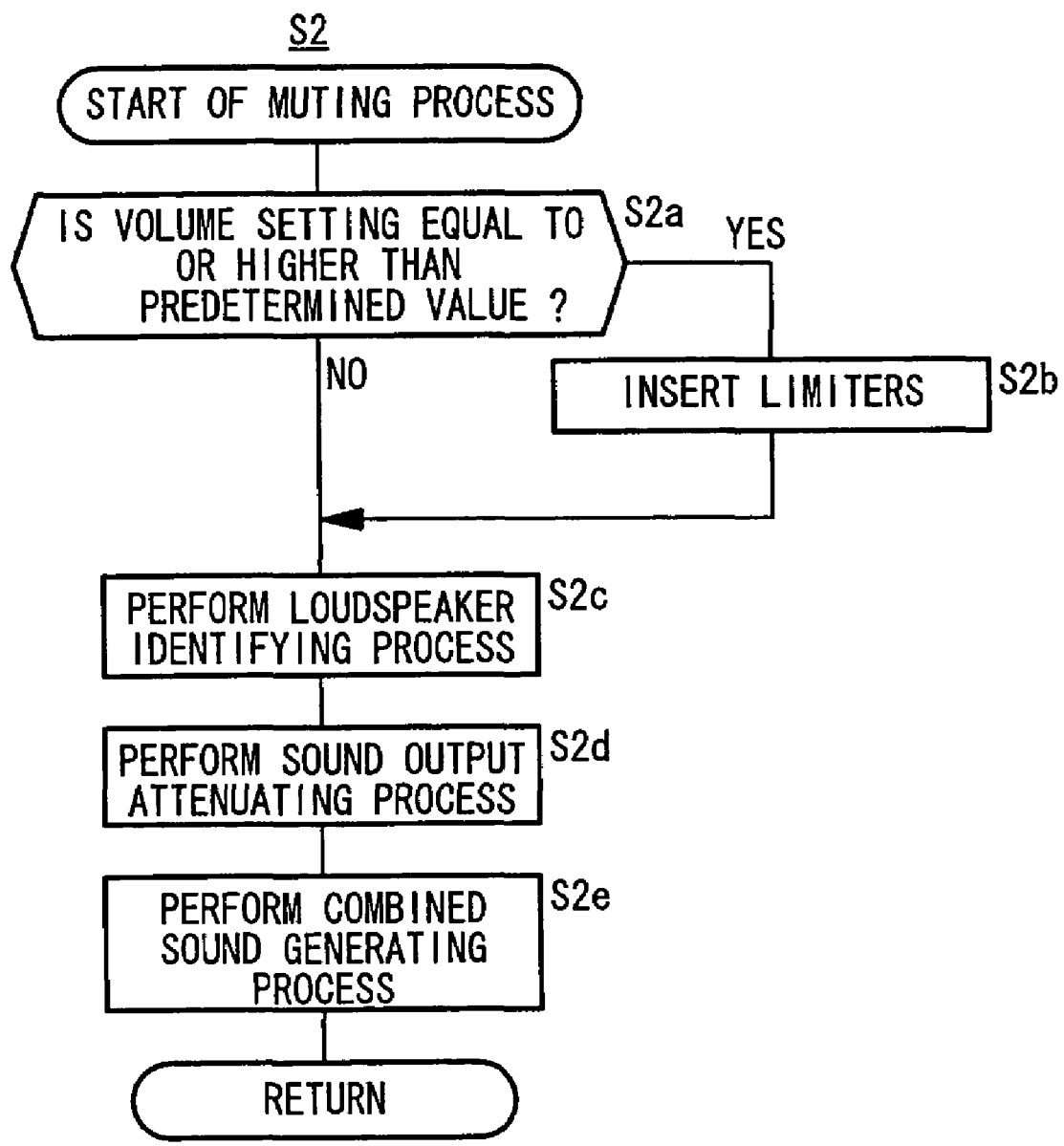
FIG. 9 is a flowchart of a muting process in the main flowchart.

If the voice input state detecting means 56 is operated to detect a voice input state for applying a voice input to the directional microphone 50, and a voice input is actually detected by the sound processor 16 in step S1, then control goes to step S2 in order to perform the muting process shown in FIG. 9.

Figure 11:
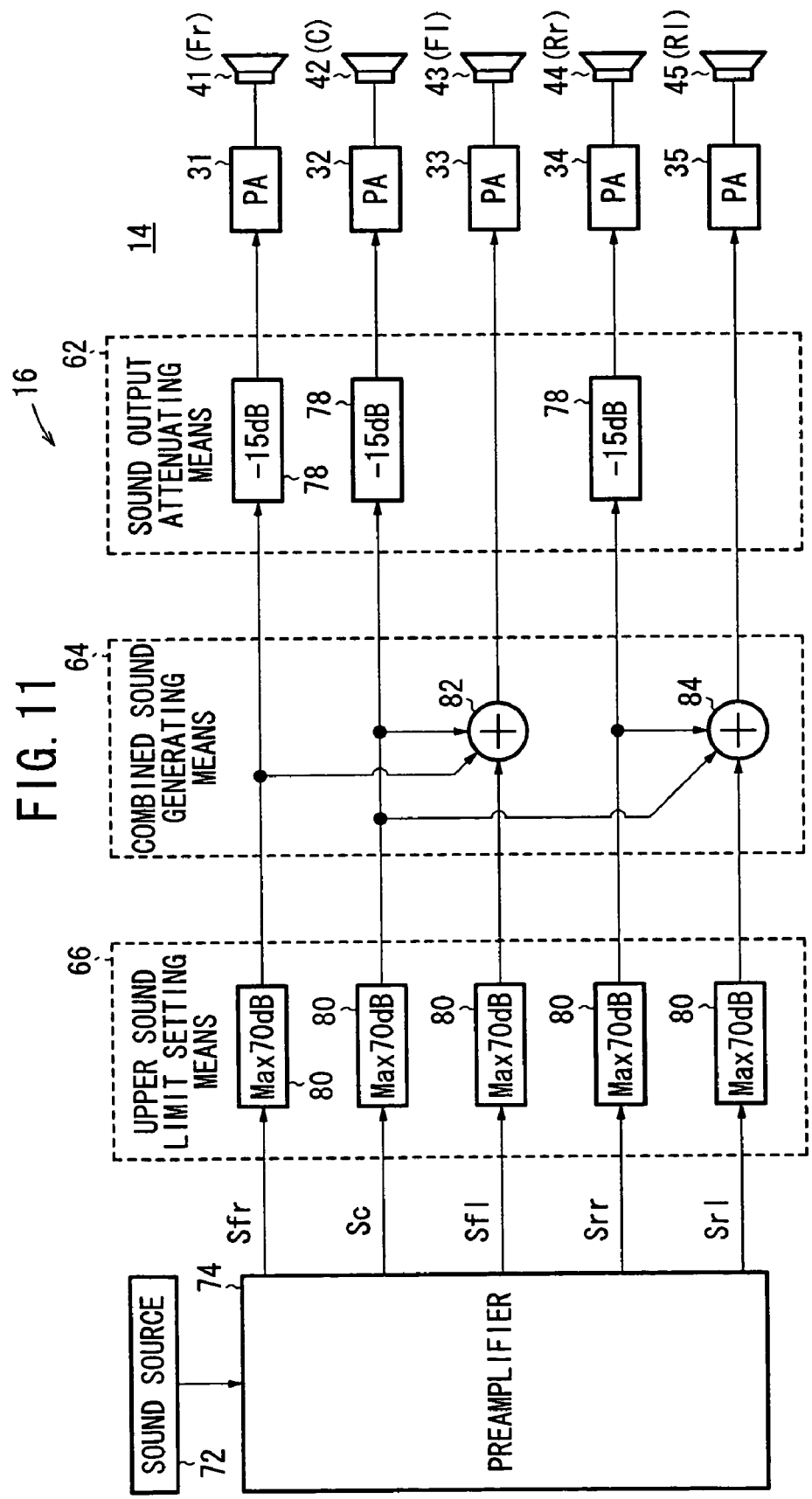
FIG. 11 is a block diagram of the sound output device, while illustrating the muting process.

The muting process is performed by the sound output device 14, as shown in FIG. 11.

When the muting process is started, the ECU 18 determines whether the volume setting made by the volume adjustment button 76 is a predetermined value of 70 dB or higher in step S2a (FIG. 9). If it is judged that the volume setting is equal to or higher than 70 dB in step S2a, then volume limiters 80 (volume limiting means), for setting a maximum value of 70 dB, are inserted into respective channels in the upper sound limit setting means 66 in step S2b as shown in FIG. 11. Consequently, the levels of the sounds output from the loudspeakers 41 through 45 are limited to 70 dB at maximum.

If it is judged that the volume setting is lower than 70 dB in step S2a, then the volume limiters 80 are not inserted into the respective channels in the upper sound limit setting means 66.

In step S2c, a loudspeaker identifying process is performed. In the loudspeaker identifying process, from among the loudspeakers 41 through 45, the central loudspeaker 42, the front right loudspeaker 41, and the rear right loudspeaker 44 included in the directivity pattern 51 shown in FIG. 2 are identified as loudspeakers which otherwise would obstruct the speech recognition process performed by the speech recognition means 52. In order to attenuate the sounds output from the loudspeakers 41, 42, 44, in step S2d, attenuators 78 for attenuating the sound levels by −15 dB are inserted into the respective channels in the sound output attenuating means 62 that correspond to the loudspeakers 41, 42, 44, as shown in FIG. 11.

Then, in step S2e, the combined sound generating means 64 is wired to provide adders 82, 84, as shown in FIG. 11. Specifically, the sound signals Sfr, Sc for the front right loudspeaker 41 and the central loudspeaker 42, which are attenuated by the sound output attenuating means 62, are combined with (i.e., added to) the sound signal Sfl for the front left loudspeaker 43, which is not attenuated by the sound output attenuating means 62, by the adder 82. The combined signal, which represents the sum (Sfr+Sc+Sfl) of the sound signals Sfr, Sc, Sfl for the front right loudspeaker 41, the central loudspeaker 42, and the front left loudspeaker 43, is amplified by the power amplifier 33, which energizes the front left loudspeaker 43 to emit the combined sound.

At the same time, the sound signals Sc, Srr for the central loudspeaker 42 and the rear right loudspeaker 44, which are attenuated by the sound output attenuating means 62, are combined with (i.e., added to) the sound signal Srl for the rear left loudspeaker 45, which is not attenuated by the sound output attenuating means 62, by the adder 84. The combined signal, which represents the sum (Sc+Srr+Srl) of the sound signals Sc, Srr, Srl for the central loudspeaker 42, the rear right loudspeaker 44, and the rear left loudspeaker 45, is amplified by the power amplifier 35, which energizes the rear left loudspeaker 45 to emit the combined sound.

Therefore, the sound signal Sc for the central loudspeaker 42 is applied to the front left loudspeaker 43 and to the rear left loudspeaker 45, which output the sound based on the sound signal Sc. Accordingly, while the speech recognition apparatus 10 carries out the speech recognition process, a natural and pleasant sound environment is developed inside the passenger compartment.

Control then returns to the main flowchart shown in FIG. 8. The ECU 18 determines whether the voice input state is finished or not in step S3. The voice input state is determined as being finished when the voice input state detecting means 56 is no longer operated, or when a certain period of time has elapsed after the voice input state detecting means 56 has been operated. If the voice input state is not determined as being finished, then the muting process continues, and the speech recognition process is performed by the speech recognition means 52.

In the speech recognition process performed by the speech recognition means 52, the speech recognition apparatus 10 outputs a command to the controlled device 20, thereby controlling the controlled device 20. Accordingly, the controlled device 20 is controlled highly accurately according to the speech recognition process, wherein the process is performed in a natural and pleasant sound environment developed in the passenger compartment.

If it is determined that the voice input state is finished in step S3, then the muting process is completed in step S4. Specifically, in step S5, the sound output device 14 is connected in the normal sound output process, as shown in FIG. 10, for outputting surround sounds in the 5.1 channels from all of the loudspeakers 41 through 45. Thereafter, the ECU 18 repeats the process from step S1.

According to the present embodiment, as described above, when a voice input to the directional microphone 50 is detected by the voice input state detecting means 56, the sound output attenuating means 62 attenuates sounds output from the loudspeakers 41, 42, 44, which otherwise would obstruct the speech recognition process carried out by the speech recognition means 52 (i.e., sounds output from the loudspeakers 41, 42, 44, which would otherwise be added to the voice applied from the speaker to the directional microphone 50, are attenuated). Further, the sound signals for the loudspeakers 41, 42, 44 are combined with sound signals for the loudspeakers 43, 45, which do not radiate sounds into the directivity pattern of the directional microphone 50, so that combined sounds are radiated from the loudspeakers 43, 45.

The speech recognition rate of the speech recognition process can thus be increased simply by attenuating sounds output from a minimum number of loudspeakers, which otherwise might radiate sounds that would be added to the speaker's voice recognized by the speech recognition process. Consequently, the voice of the speaker can be recognized highly accurately in a natural and pleasant sound environment, even when different sounds are radiated from the left and right loudspeakers for producing stereophonic sound effects.

Figure 12:
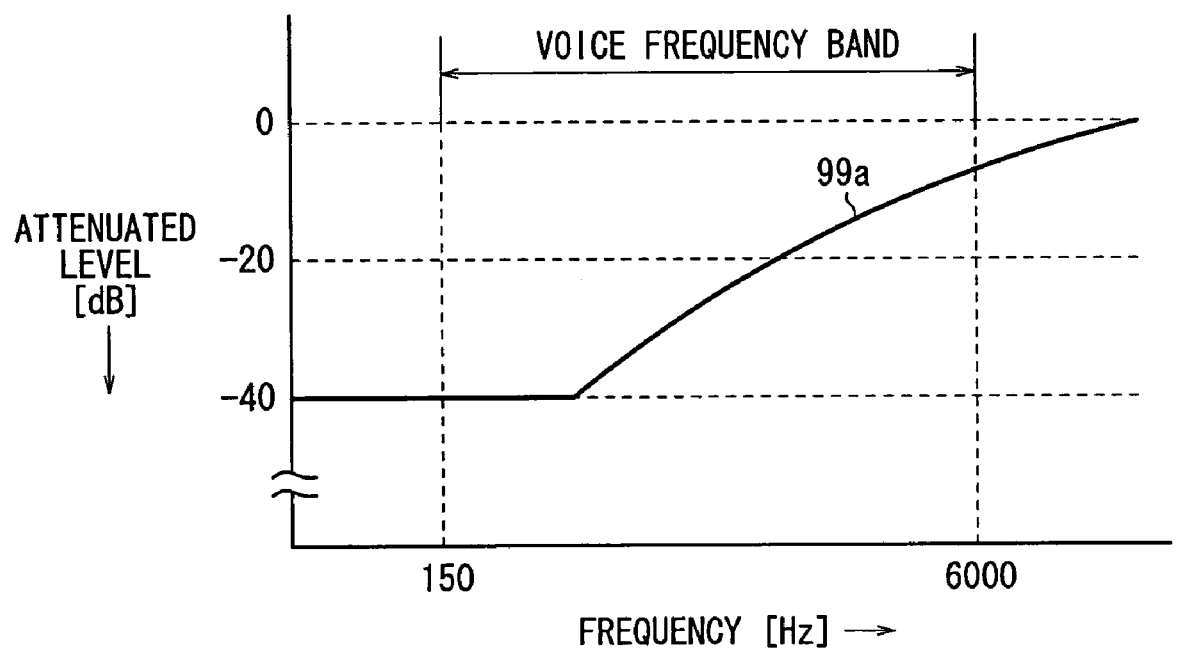
FIG. 12 is a diagram showing frequency characteristics of another muting process.

Rather than attenuating the sounds output from the loudspeakers 41, 42, 44 by −15 dB as shown in FIG. 11, the sounds output from the loudspeakers 41, 42, 44 may be attenuated by a level which is progressively smaller at higher frequencies, e.g., by a level of −40 dB at frequencies in the vicinity of 150 Hz at the lower end of the voice frequency band, and by a level of −10 dB at frequencies in the vicinity of 6000 Hz at the higher end of the voice frequency band, as indicated by the high-pass characteristic curve 99a shown in FIG. 12.

Figure 13:
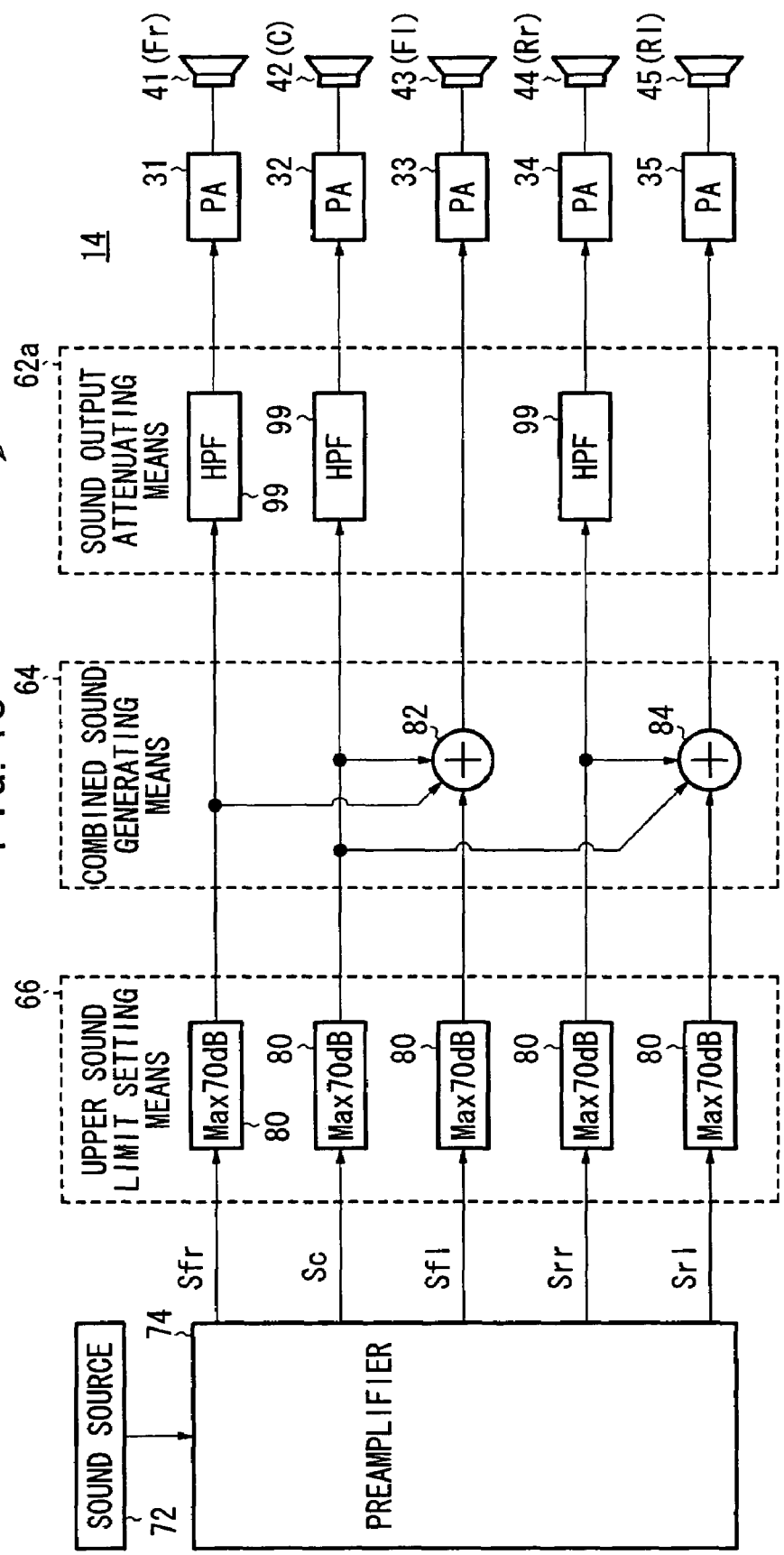
FIG. 13 is a block diagram of a sound output device combined with a sound output attenuating means incorporating filters having the frequency characteristics shown in FIG. 12.

The sound processor 16 shown in FIG. 13 includes a sound output attenuating means 62a comprising high-pass filters 99, each having a high-pass characteristic curve 99a as shown in FIG. 12, inserted into the respective channels that correspond to the loudspeakers 41, 42, 44. Since the high-pass filters 99 pass a higher level of sound signals at higher frequencies, the sound processor 16 shown in FIG. 13 can provide a more natural sound environment, while still allowing the speech recognition apparatus 10 to recognize speech highly accurately.

Figure 14:
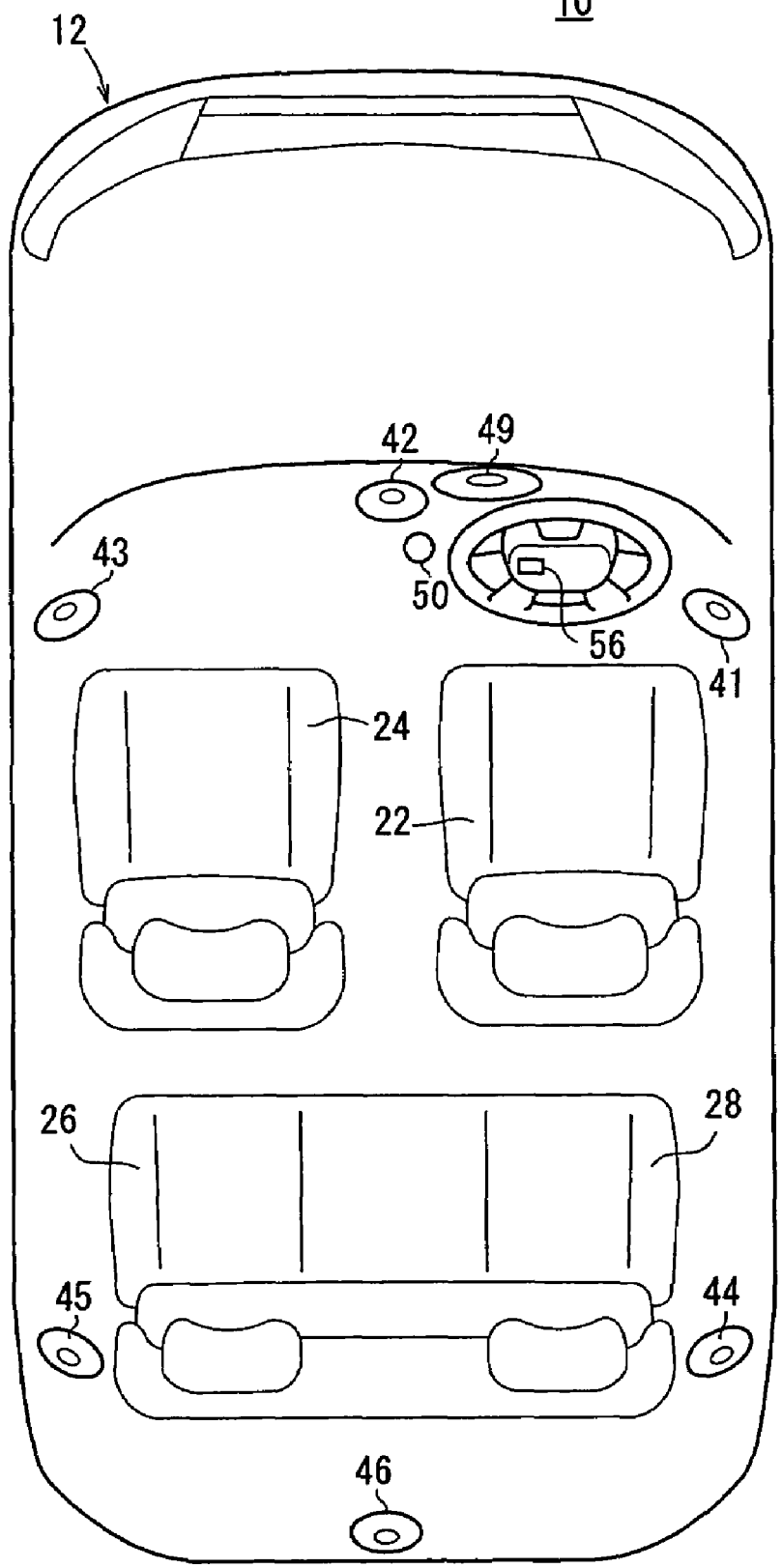
FIG. 14 is a schematic plan view of the passenger compartment of a vehicle, showing a loudspeaker layout for a 6.1-channel surround system incorporated therein.

In the above embodiments, a 5.1-channel surround system has been illustrated as a surround system having independent front, rear, left, and right channels. However, the principles of the present invention are also applicable to a 4-channel surround system, or a 6.1-channel surround system which comprises, as shown in FIG. 14, a 5.1-channel surround system including a superwoofer 49 and a rear central loudspeaker 46 mounted on a tonneau cover in the vehicle 12, or a 7.1-channel surround system which comprises a 5.1-channel surround system and two left and right loudspeakers mounted on the tonneau cover instead of the rear central loudspeaker 46.

Although certain preferred embodiments of the present invention have been shown and described in detail, it should be understood that various changes and modifications may be made therein without departing from the scope of the appended claims.

What is claimed is:

1. A speech recognition apparatus comprising:
a directional voice input unit for inputting voice from a speaker;
a voice input state detector for detecting a voice input state in which the voice from the speaker is input to said directional voice input unit;
a speech recognizer for recognizing the voice input from said directional voice input unit and outputting a command corresponding to a recognized voice;
a sound output unit for outputting a plurality of sound signals in a plurality of channels to corresponding loudspeakers;
a sound output attenuator for attenuating at least one sound output from at least one selected loudspeaker which otherwise would obstruct a speech recognition process performed by said speech recognizer when said voice input state detector detects the voice input state; and
a combined sound generator for combining at least a first one of said plurality of sound signals output to said at least one selected loudspeaker whose output sound is attenuated, with at least a second one of said plurality of sound signals output to at least one other loudspeaker whose output sound is not attenuated, thereby producing at least one combined sound signal that is provided to the at least one other loudspeaker;
wherein a content of said first one of said plurality of sound signals is different a content of said second one of said plurality of sound signals.

2. A speech recognition apparatus according to claim 1, wherein said sound output unit comprises a surround system having at least front, rear, left, and right independent channels.

3. A speech recognition apparatus according to claim 1, wherein said sound output attenuator attenuates only sounds in a frequency range that is used in said speech recognition process performed by said speech recognizer.

4. A speech recognition apparatus according to claim 3, wherein said sound output attenuator comprises a high-pass filter for attenuating a higher level of sound signals at frequencies in the vicinity of a lower end of the voice frequency band, and a lower level of sound signals at frequencies in the vicinity of a higher end of the voice frequency band.

5. A vehicle incorporating therein the speech recognition apparatus according to claim 1.

6. A speech recognition apparatus comprising:
a microphone array for inputting voice from a speaker and outputting a delay sum output signal from a speaker on the driver's seat in a vehicle and a delay sum output signal from a speaker on a passenger seat in the vehicle;
a voice input state detector for detecting a voice input state in which the voice from the speaker on the driver's seat is input to said microphone array when the delay sum output signal from the speaker on the driver's seat reaches a predetermined level, and for detecting a voice input state in which the voice from the speaker on the passenger seat is input to said microphone array when the delay sum output signal from the speaker on the passenger seat reaches a predetermined level;
a speech recognizer for recognizing the voice input from said microphone array and outputting a command corresponding to a recognized voice;
a sound output unit for outputting a plurality of sound signals in a plurality of channels to corresponding loudspeakers;
a sound output attenuator for attenuating at least one sound output from at least one selected loudspeaker which otherwise would obstruct a speech recognition process performed by said speech recognizer when said voice input state detector detects the voice input state; and
a combined sound generator for combining at least a first one of said plurality of sound signals output to said at least one selected loudspeaker whose output sound is attenuated, with at least a second one of said plurality of sound signals output to at least one other loudspeaker whose output sound is not attenuated, thereby producing at least one combined sound signal that is provided to the at least one other loudspeaker;
wherein a content of said first one of said plurality of sound signals is different from a content of said second one of said plurality of sound signals.

7. A speech recognition apparatus according to claim 6, wherein said sound output unit comprises a surround system having at least front, rear, left, and right independent channels.

8. A speech recognition apparatus according to claim 6, wherein said sound output attenuator attenuates only sounds in a frequency range that is used in said speech recognition process performed by said speech recognizer.

9. A speech recognition apparatus according to claim 8, wherein said sound output attenuator comprises a high-pass filter for attenuating a higher level of sound signals at frequencies in the vicinity of a lower end of the voice frequency band, and a lower level of sound signals at frequencies in the vicinity of a higher end of the voice frequency band.

10. A vehicle incorporating therein the speech recognition apparatus according to claim 6.

* * * * *